United States Patent [19]
Broadway

[11] 4,074,160
[45] Feb. 14, 1978

[54] ROTARY ELECTRIC MACHINES

[75] Inventor: Alexander Richard William Broadway, Bristol, England

[73] Assignee: National Research Development Corporation, London, England

[21] Appl. No.: 598,945

[22] Filed: July 25, 1975

[30] Foreign Application Priority Data

Dec. 22, 1972 United Kingdom ............ 59401/72

[51] Int. Cl.² ............................................. H02K 3/00
[52] U.S. Cl. .................................... 310/184; 310/112; 310/162; 310/166; 310/197
[58] Field of Search ................ 310/198, 200–208, 310/112–114, 162–164, 269, 211, 166, 183, 180, 184, 158, 159, 166, 197; 318/42, 47, 48, 83, 111, 172, 181, 239

[56] References Cited

U.S. PATENT DOCUMENTS

| 1,617,092 | 2/1927 | Yamamoto | 318/47 |
| 2,217,460 | 10/1940 | Trassl | 310/202 |
| 2,500,595 | 3/1950 | Young | 318/111 |
| 2,733,362 | 1/1956 | Bauer | 310/162 |
| 2,959,720 | 11/1960 | Shemanske | 318/42 |
| 2,989,655 | 6/1961 | Howsinger | 310/162 |
| 3,047,755 | 7/1962 | Angst | 310/162 |
| 3,210,584 | 10/1965 | Jorgensen | 310/162 |
| 3,728,564 | 4/1973 | De Rugeris | 310/198 |
| 3,732,448 | 5/1973 | Schiethart | 310/162 |
| 3,793,544 | 2/1974 | Baumgartner | 310/198 |

FOREIGN PATENT DOCUMENTS 36,236 11/1922 Norway .............................. 318/47

Primary Examiner—R. Skudy
Attorney, Agent, or Firm—Larson, Taylor and Hinds

[57] ABSTRACT

Alternating-current, brushless, stator-controlled, asynchronous or synchronous-running, induction machines having a rotor with asymmetry in two axes electrically at right-angles, comprising two machine units coupled mechanically and electrically, to avoid the disadvantage of low-frequency currents in the mains supply experienced with single units. The coupled machine units are preferably combined in a single frame, providing right-angle electrical displacement between the two units. In one form, a single rotor is common to both stator elements. Asynchronous running is effected by extracting slip energy. Also synchronous rnning can be effected by d.c., as well as a.c., energizing of the stator windings In neither mode of operation are connections to the rotor required.

14 Claims, 13 Drawing Figures

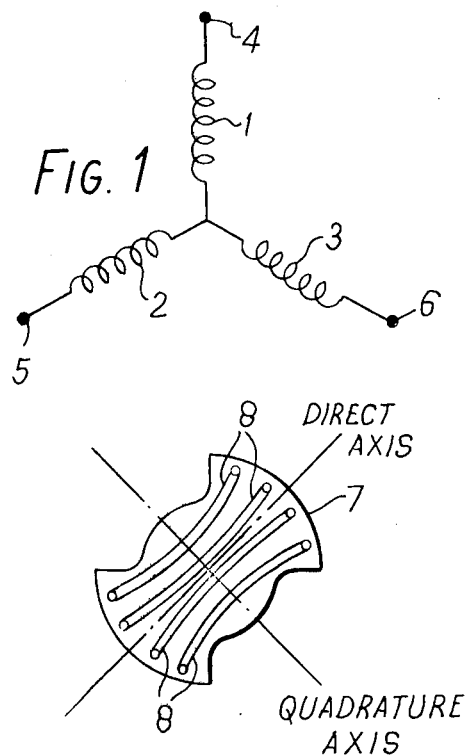
FIG. 1
FIG. 2a
FIG. 2b
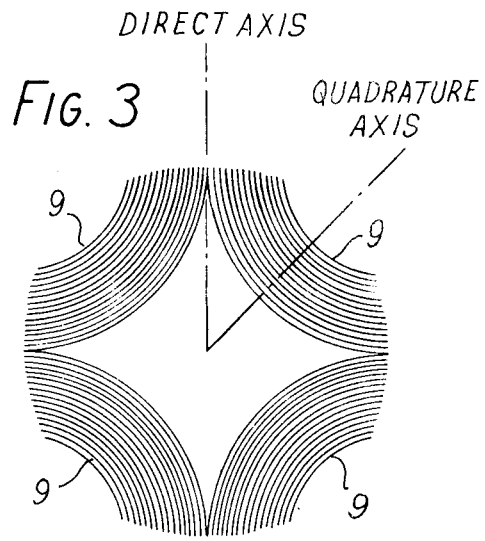
FIG. 3

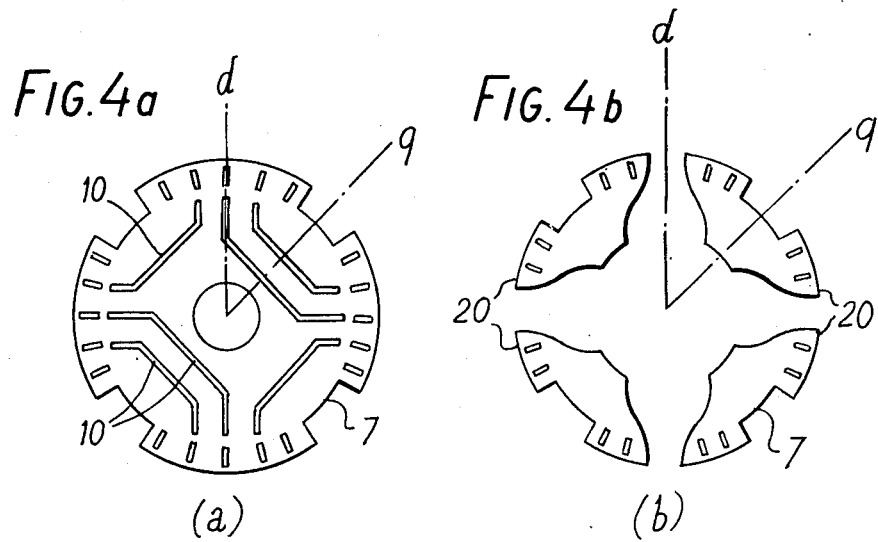
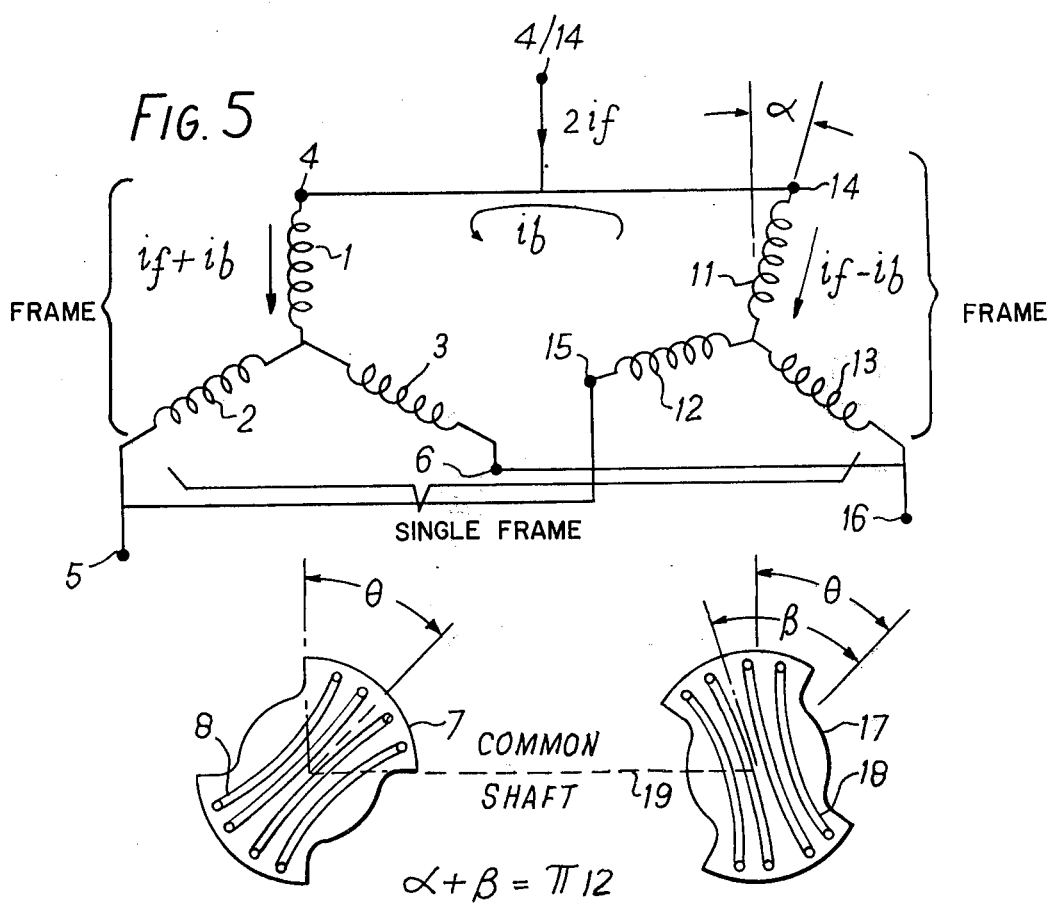

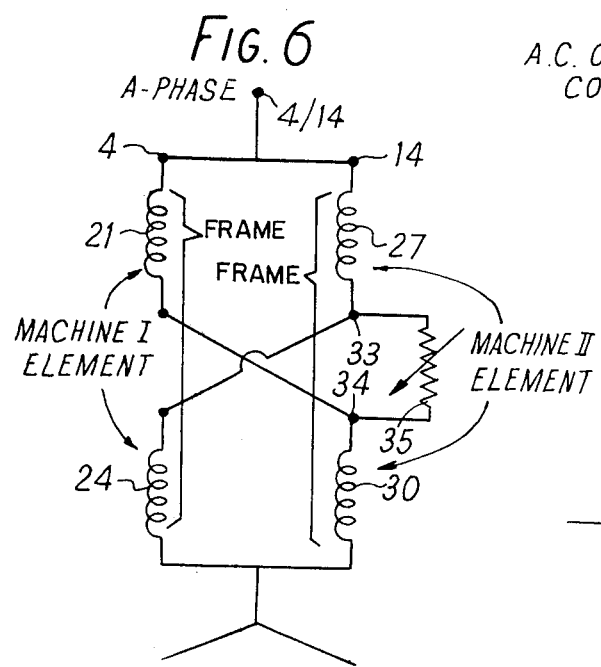
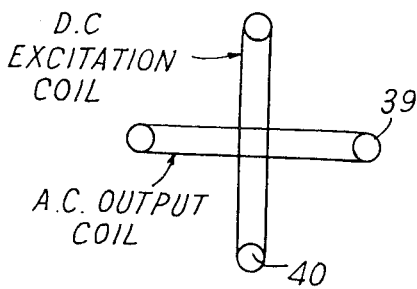
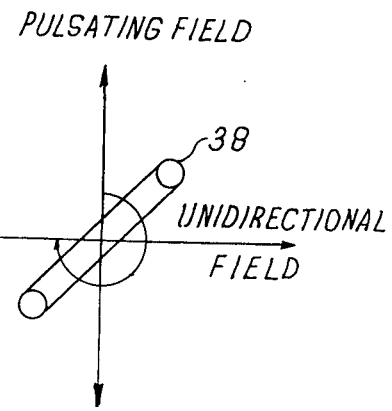

ROTARY ELECTRIC MACHINES

This invention relates to rotary and linear electric machines and particularly to brushless, stator-controlled motors.

It is known that a conventional induction motor can run at half its normal speed when asymmetry exists in the rotor winding, or when the rotor is constructed with some magnetic asymmetry in two axes electrically at right angles. However, in such an induction motor, half-speed asynchronous running is inevitably accompanied by low-frequency variation of the stator currents. For this, and other reasons, such an arrangement is inferior to a normal induction motor wound with twice the number of poles, and has not found any industrial application.

The object of one form of the present invention is to provide a brushless, stator-controlled, asynchronous motor in which such low-frequency stator currents are excluded from the supply mains.

The object of another form of invention is to provide such a machine adapted for synchronous operation.

Accordingly, the invention provides an alternating-current, brushless, stator-controlled electric motor comprising two similar machine elements each having a wound stator and a rotor with rotor asymmetry in two axes electrically at right-angles, the said two machine elements being coupled together mechanically and connected together electrically in parallel with electrical displacement one unit with respect to the other, the sum of the electrical displacement between the stator windings and of the electrical displacement between corresponding rotor axes being substantially $\pi/2$ radians.

According to one form of the invention, such a two machine-element motor is adapted for asynchronous running by the extraction of slip energy relative to the reverse field-systems.

According to another form of the invention, such a machine is adapted for synchronous running by feeding the stator windings simultaneously with alternating current and with direct current.

A machine is described herein, in which two identical machine elements are combined to exclude the low frequency currents from the mains.

Synchronous operation of the combined machine elements can be achieved by doubly-feeding the stator windings with alternating and direct current. This is achieved without alternating current flowing in the direct current supply, and without direct current flowing in the alternating current supply.

The two stator and rotor units may be combined in a single two-bearing frame, and the rotor may be made as a single-unit common to the two stators. Such a machine is simple to construct and is compact and mechanically robust.

The resultant machine is brushless. Nevertheless, it can be operated synchronously and its power-factor controlled in a manner similar to a conventional d.c. excited synchronous machine. As a motor with a high power-factor, which may be of the order of unity, the current demand from the a.c. supply is greatly reduced as compared with an induction motor or synchronous reluctance motor. There is thus a considerable saving in terms of the supply equipment, especially when the supply is from static convertors.

Conventional d.c. excited synchronous motors are rarely made in small or medium sizes. This is because of the high cost of providing slip-rings, brushes and a rotating exciter, in addition to the main machine. In a brushless type of conventional machine, the slip-rings and brushes are replaced by rotating rectifier equipment and rotating control circuitry, which further add to the cost. It is for these reasons that the synchronous reluctance motor has found favour recently. When a high power-factor is specially advantageous, a machine according to the present invention may well find application in preference both to the synchronous reluctance motor and to the conventional type of d.c. excited machine, particularly in small sizes.

A machine according to the invention can also operate in the same way as a conventional wound-rotor induction motor, with torque/speed control, but without making any external connections to the rotor winding. This is achieved either by a form of resistance control or by a slip-energy recovery scheme connected to the stator windings.

At exactly half synchronous speed, the field system in each machine-element of a motor according to the invention has a unidirectional component in one axis relative to the stator. In a second axis, electrically at right angles to the first, a second field-component alternates at the same frequency as the supply. The different effect in one axis, as compared with the other, is due to the influence of the rotor. According to a further form of the invention, this cross-field effect is utilised to produce a single-phase brushless alternator of unusually simple and robust construction.

In order that the invention may be readily carried into practice, embodiments of the several forms of the invention will now be described, by way of example, with reference to the accompanying drawings, in which:

FIG. 1 shows a basic machine unit comprising a 3-phase primary winding and a salient-pole rotor;

FIG. 2a and FIG. 2b show rotor windings short-circuited in the quadrature axis;

FIG. 3 shows a 4-pole rotor or axially-laminated construction;

FIG. 4a and FIG. 4b show reluctance-type rotors for use in machines according to the invention;

FIG. 5 is a diagram showing a two-component machine having mechanical and electrical coupling, for asynchronous running;

FIG. 6 is a diagram showing the stator winding connection, per phase, of two machines for torque-speed control;

FIG. 7 is a diagram showing the manner of d.c. excitation of a two component 3-phase stator winding, for synchronous running;

FIG. 8 shows the two stator coils and short-circuited rotor combination for a cross-field alternator;

Figure 9A:
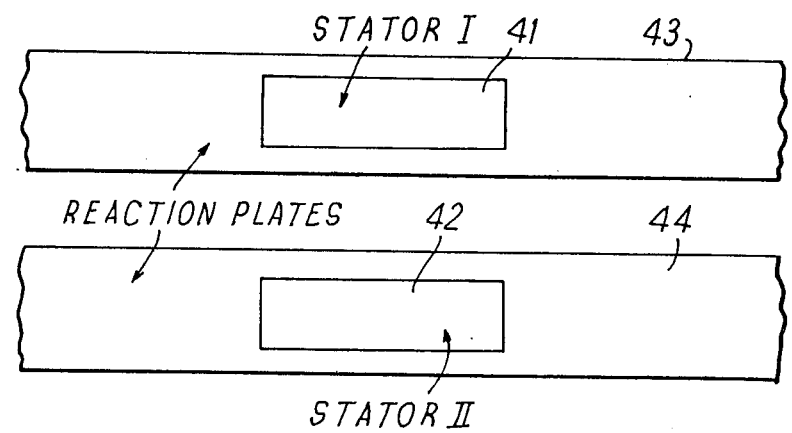
FIG. 9a and FIG. 9b are diagrams showing two forms of linear double-stator machine.

In an induction motor, any electric or magnetic asymmetry, in rotor axes electrically at right angles, gives rise to a field component which rotates in the reverse direction relative to the rotor. The speed of the reverse field is given by $s\omega/p$ rad/s, where $s$ is the slip, $\omega$ is the angular frequency of the supply and $p$ is the number of pole pairs. Since the angular velocity of the rotor is $(1-s)\omega/p$ rad/s, the reverse field-component rotates at $(2s-1)\omega/p$ rad/s in the backward direction relative to the stator. Currents of angular frequency $(2s-1)\omega$ are induced in the stator winding, and these interact with the reverse field so as to produce a component of torque which is positive for $s > \frac{1}{2}$ and negative for $s < \frac{1}{2}$.

At exactly half normal synchronous speed, the reverse-rotating rotor field is stationary with respect to the stator. If the stator winding is fed with direct current, in addition to 3-phase alternating currents, so as to superimpose a stationary stator field, a synchronous torque is then developed. This synchronous mode of operation is well known, but no satisfactory method of providing simultaneous d.c. and a.c. excitation of a single winding has hitherto been devised.

The basic configuration of a 2-pole machine-unit is shown in FIG. 1. A 3-phase primary winding 1, 2 and 3 which is star-connected between terminals 4, 5 and 6 is wound in a laminated cylindrical stator core, in the same way as in a conventional induction motor. A rotor 7 is constructed so as to maximise the difference between the direct-axis impedance and the quadrature-axis impedance, at all speeds. The rotor 7 is therefore of salient-pole construction, as shown, or may be wound with a single-phase winding, or both.

When constructed with both electric and magnetic asymmetry, the rotor winding must, in effect, be short-circuited in the quadrature axis, only. These characteristics are required both for asynchronous and synchronous running.

A simple form of salient-pole rotor construction, which has a short-circuited winding in the quadrature axis, is shown in FIG. 1. The coils in the quadrature axis, referenced 8 in the figure, are connected in series and the combination short-circuited on itself. Alternatively, the coils may be individually short-circuited.

One possible winding arrangement, consisting of concentric groups of coils, is shown in FIG. 2(a). Another possible 2-pole arrangement is shown in FIG. 2(b). This latter arrangement consists of two conductors short-circuited by end rings and the remaining conductors formed into short-circuited loops. For practical convenience, the conductor loops may be formed into 'U' shapes and short-circuited by one of the end rings.

In a machine such as is described with reference to FIG. 1 and FIG. 2(a) or FIG. 2(b), two component fields, of the same pole-number, are produced and the speed of operation is one-half the synchronous speed.

An axially laminated form of rotor construction has been proposed by Russell and Norsworthy, and has been described in a paper: Russell, R. L., and Norsworthy, K. H. 'A stator-fed half-speed synchronous motor', Proc.I.E.E., 1957, Vol. 104A, pp 77-87. This form of rotor has the desirably high degree of magnetic asymmetry for the requirements of the present invention and has shortcircuited paths within the axial shortcircuited predominantly in the quadrature axis.

A 4-pole type of axially laminated construction is shown in FIG. 3. In the construction shown, four groups of laminations 9 each subtend 90° of the rotor axis, forming four poles. The rotor is thus symmetrical about both the direct and the quadrature axes.

In a rotor of the construction shown in FIG. 3, it may be preferable to induce the quadrature axis currents in material of higher conductivity than that of iron. The rotor may then take the form of iron laminations interleaved with copper or aluminum laminations.

Alternatively, the magnetic asymmetry can be obtained by adopting the form of construction used in modern reluctance motors. Two types of 4-pole rotor construction are shown in FIG. 4(a) and FIG. 4(b).

Each rotor 7 is designed for a high ratio of direct-axis to quadrature-axis impedance. This is done by means of flux barriers referenced 10 in the left half of the rotor 7 in FIG. 4(a), and by means of a segmental form of construction providing four similar 90° segments 20 in FIG. 4(b). Any winding not shown in the figures, which is included should, as already discussed, be short-circuited in the quadrature axis only.

Such an arrangement is shown in FIG. 5. In FIG. 5 there are shown two machine elements corresponding to that shown in FIG. 1. The machine element on the left hand side of the figure is similarly referenced as in FIG. 1. The corresponding machine element on the right hand side of the figure has a 3-phase stator winding 11, 12 and 13 star-connected between terminals 14, 15 and 16. A rotor element 17 is a salient pole rotor with short-circuited windings 18.

The two 3-phase windings are connected in parallel and supplied from terminals 4/14, 5/15 and 6/16. The two 3-phase windings are shown as relatively displaced electrically by an angle $\alpha$.

The two rotor elements 7 and 17 are coupled mechanically by a common shaft 19. The electrical spacing between corresponding axes of the two rotors is shown as an angle $\beta$ and the two rotor combination is shown rotated through an angle $\theta$ from the reference position.

For asynchronous operation of a machine according to the invention, the current in each phase of one machine-element consists of two components; one of angular supply frequency, $\omega$, and the other of angular frequency, $(2s-1)\omega$. The first component is referred to as $i_f$, corresponding to the forward field component, and the second component is referred to as $i_b$, corresponding to the backward field-component.

A machine according to the invention, adapted for asynchronous operation consists of two identical machine-elements, coupled together. When the two elements are coupled mechanically and supplied in parallel, the currents $i_f$ taken by each machine-element are exactly equal in both magnitude and phase. They can be shown to be independent of the relative space positions both of the stator windings and of the rotor axes.

The currents $i_b$ taken by each of the two units are also equal in magnitude, but the phase displacement between them is then dependent on the relative space positions of the stator windings and the rotor axes. Relative space positions can thus be found when the currents, $i_b$, taken by each unit, are in antiphase. In these circumstances, the component of $i_b$ flowing in the supply mains, must be zero. The current, $i_b$, of angular frequency, $(2s-1)\omega$, then circulates wholly within the stator windings. This situation can be shown to occur when $\alpha + \beta = \pi/2$, where $\alpha$ is the electrical space-displacement between the stator windings, and $\beta$ is the displacement between the coupled rotors.

Two cases of special interest arise when $\alpha = 0$ and $\beta = \gamma/2$; and when $\alpha = \pi/2$ and $\beta = 0$. In the former case, the stator windings are cophasal in space, and the rotors are displaced by $\pi/2$ electrical radians. In the latter case, the stator windings are at right-angles, electrically, and the rotor axes are coincident.

In this second case, there may sometimes be constructional advantages because of the zero angle of displacement between the rotors.

For torque/speed control of a machine as shown in FIG. 5, energy may be extracted from the stator windings with respect to the voltages and currents of angular frequency $(2s-1)\omega$.

In each phase-winding of each machine-element it is readily possible to find two winding sections in which the induced e.m.f.'s of fundamental frequency are equal. There will thus be a total of four winding sections, in the combination of two machine units, in which equal fundamental e.m.f.'s are induced.

E.m.f.'s arising from the reverse field-component are in antiphase in the two machine-elements. These half-winding sections may be interconnected, and may be provided with two tapping points, between which e.m.f's are induced due to the reverse field, but which are at equal potential with respect to the e.m.f.'s of fundamental frequency.

FIG. 6 is a diagram showing the phase-winding interconnections and the disposition of a control resistor for one phase of both machine elements for torque-speed control.

The 2-pole coil grouping coil-group numbers for machine element I are as follows:

| A | −C | B | −A | C | −B |
|---|----|---|----|---|----|
| 21 | 22 | 23 | 24 | 25 | 26 | and for machine element II, are as follows:

| A | −C | B | −A | C | −B |
|---|----|---|----|---|----|
| 27 | 28 | 29 | 30 | 31 | 32 |

As shown in the figure, the phase windings (phase A) are supplied from terminal 4/14. Coil-group 21 is interconnected with coil-group 30 and coil-group 27 is interconnected with coil-group 24.

A control resistor 35 is connected between coil-groups 27 and 30 at terminals 33 and 34. Terminals 33 and 34 are at equal potential to e.m.f.'s of fundamental freqency. E.m.f.'s of angular frequency $(2s-1)\omega$ are induced between terminals 33 and 34.

Energy may be extracted through resistor 35 with respect to the reverse field-system only. This is the requirement for torque-speed slip-energy control.

FIG. 7 shows an arrangement for d.c. excitation for the purpose of providing synchronous running of a machine of the form shown in FIG. 5. Corresponding elements have the same reference numbers in the two figures. The star-points of the two 3-phase windings are referenced 36 and 37, respectively. For the windings of each machine element, phase-winding B is isolated from the star-point of its own 3-phase winding and connected to the star-point of the other 3-phase winding. Thus, phase-winding 3 is connected between terminal 37 and terminal 6 and phase-winding 13 is connected between terminal 36 and terminal 16.

The winding arrangements and rotor construction for good synchronous running are exactly the same as for good asynchronous running. For synchronous running, however, direct current must be supplied to both sets of stator windings. This can be done in such a way as to set up a stationary field in each machine-element, without causing a component of the direct current to flow in the a.c. supply, and vice versa.

This is achieved in the arrangement shown in FIG. 7 by connection of a d.c. voltage between terminals 36 and 37. The resulting direct currents are equal in magnitude; but in each machine-element, the direction of current in one phase-winding is reversed relative to the current flow in the other phase-windings. In this manner, a stationary field is established in each unit. The terminals 36 and 37 are at equal a.c. potentials, and the terminals 4/14, 5/15 and 6/16 are at equal d.c. potentials. No a.c. current can therefore flow in the d.c. supply, or vice-versa.

An alternative method of d.c. excitation for synchronous operation of the two-element machine makes use of the stator connections shown in FIG. 6.

FIG. 6, as described earlier herein, refers to torque-speed control of the new machine when operated asynchronously. Slip-energy is extracted from each phase of the stator windings as typified by that from the A-phase, shown in the Figure. In that particular case, slip-energy from the A-phase is dissipated in the external resistance 35 connected between the terminals 33 and 34.

This same form of connection may be used for synchronous operation of the machine. Instead of connecting a resistance between the terminals 33 and 34, a source of direct current may be connected between these terminals, for synchronous running. By so doing; the desired stationary fields are set up in each machine without d.c. flowing in the a.c. source, and vice-versa. The terminals 33 and 34 are at the same a.c. potential, and the a.c. supply terminals are at the same d.c. potential.

The B and C phases may similarly be supplied from sources of d.c. excitation. When more than one phase is supplied with direct current, however, the separate phases should be supplied from isolated d.c. sources, to avoid circulating alternating currents. That is, any interconnection between the d.c. sources should, in effect, be of high impedance, and preferably of infinite impedance, to alternating current.

Generally, the direction of direct-current flow in any one phase should be opposite to that in either of the other two phases. This is not an essential condition, but it is desirable for making the most effective use of the windings.

By way of example, the magnitudes and directions of the direct currents may be relatively $+1$, $-\frac{1}{2}$ and $-\frac{1}{2}$. These relative values are the same as in one of the two well-known methods of feeding direct current to the conventional wound-rotor synchronous-induction motor.

According to the other well-known method, the relative values would be $+1$, $-1$ and zero. In this second case, only two separate d.c. sources would be needed. There are several other possibilities but these two give rise to high resultant m.m.f.'s per unit copper loss when more than one phase is excited.

When the direct currents are relatively $+1$, $+1$ and $-1$, there is an equivalence between this method of d.c. excitation and that already described with reference to FIG. 7.

There is a much greater flexibility in the method of d.c. excitation last described, with reference to FIG. 6, as compared with that previously described. Isolated d.c. sources are needed but since, in parctice, the d.c. excitation would most likely be obtained from a transformer-rectifier circuit, there would be no problem in providing separate secondary windings on the transformer for the separate sources.

The alternative method of d.c. feeding, described above with reference to FIG. 6, may be regarded as a special case of a.c. feeding, the frequency of the secondary sources of current being zero, in this case. In the general case of double feeding, a mains supply is connected to the supply terminals of the machine, and secondary sources of a.c. power are connected to terminals of each stator phase, as typified by terminals 33 and 34 of the A-phase shown in FIG. 6.

In general, the machine of the present invention is suitable for use in any of the modes of operation in which the conventional wound-rotor slip-ring machine is used.

FIG. 8 is a diagram showing a 'cross-field' machine, a development arising out of the basic half-speed machine. The arrangement of FIG. 8 consists of two stator coils, or two sets of stator coils, arranged at right angles to each other. The rotor must have the same properties of electric or magnetic asymmetry, or both, as in the basic machine.

Suppose, for simplicity, that the rotor 38 consists of a single short-circuited coil, as shown in FIG. 8. Suppose also that of the two stator coils 39 and 40, the coil 40 is energised with direct current. A unidirectional field is produced in one (stator) axis of the machine.

When the rotor 38 is driven, a current is induced in the rotor coil. This situation is directly analagous to the short-circuited conditions in a single-phase alternator. The current in the rotor coil varies periodically at a frequency dependent on the speed of rotation.

There is an armature-reaction effect, from the rotor, which tends to reduce the steady unidirectional field set up by the stator. In addition, the rotor clearly produces a pulsating field in the axis at right angles to the steady stator-field. This pulsating field varies cyclically at twice the frequency of the rotor currents. There is thus a flux-linkage with the second stator coil arising from the cross-field effect of the rotor. The current in the rotor coil is limited by a counter e.m.f. induced by the pulsating field.

The same effects are produced by magnetic asymmetry in the rotor 38, or by a combination of electric and magnetic asymmetry, as in the basic machine of FIG. 1.

The pulsating field will tend to be decreased when a lagging load current is taken from the stator, and will tend to be increased when the load-current is leading. Most applications will therefore need some form of excitation control in the same way as does a conventional d.c. excited alternator.

The type of single-phase alternator shown in FIG. 8 is very simple to manufacture, is brushless and is mechanically robust. It can therefore be driven, reliably, at high speeds. As such it may well find application for d.c. power supplies or for battery charging etc., when used with a rectifier.

Figure 9B:
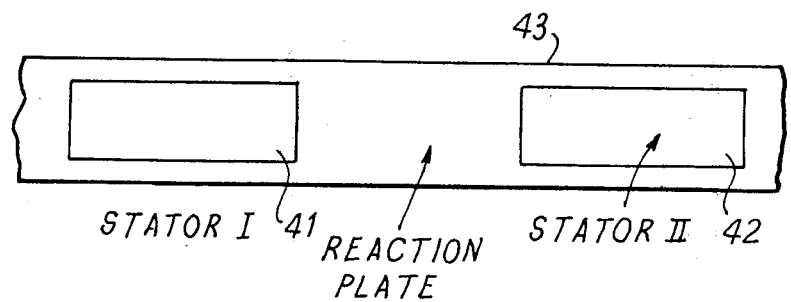

The two-element machine of the invention described herein may, in common with all cylindrical machines, be adapted to provide a linear motor. Such a stator-controlled linear motor, however, has many advantages over the conventional linear induction motor. FIG. 9a and FIG. 9b show forms of linear double-stator machine. FIG. 9a shows a first form having a first stator 41 associated with a first reaction plate 43 and a second stator 42 associated with a second reaction plate 44. FIG. 9b shows a second form of linear machine having the two stators 41 and 42 associated with a single reaction plate 43 and placed lengthwise relatively thereto.

By the use of two stators 41 and 42 and a reaction plate or reaction plates of very simple construction, controlled operation by slip-energy recovery is possible. Unlike the conventional linear machine, slip-energy may be extracted from the stators, there being no need for any connection to the secondary member. A means of torque-speed control which is relatively simple and cheap, as compared with control by adjustable supply frequency, is thus feasible.

Although two stators 41 and 42 are needed, each stator is fully utilised, and the two elements of the machine contribute equally to the output power.

In the corresponding rotary machine, the two stators are placed axially side-by-side with a common, or coupled, rotor. If the cylindrical machine were, hypothetically, to be rolled out flat, the stators 41 and 42 would be side-by-side, as shown in FIG. 9a. There would then also be a need for two reaction plates, 43 and 44. Instead, it is clearly of much greater practical convenience to place the stators lengthwise, as shown in FIG. 9b, so that a common reaction plate 43 can be employed for both stators 41 and 42.

The reaction plate 43 should be constructed so that it has impedances which are as widely different as possible in two axes displaced by one-half of a pole-pitch (90 electrical degrees). This desired effect can be achieved magnetically or electrically, or both, as in the equivalent cylindrical machine.

Figure 10:
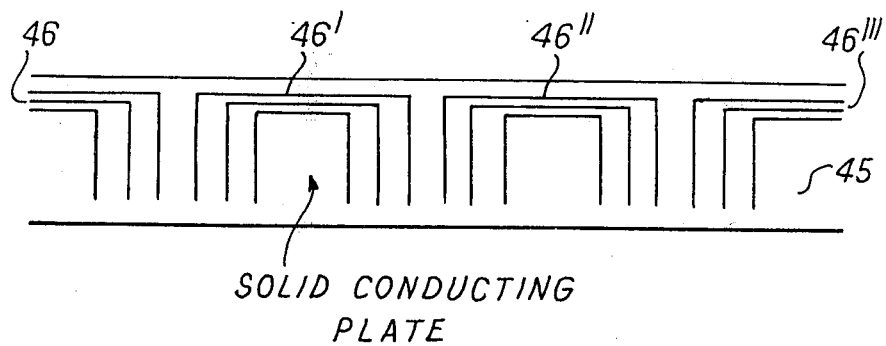
FIG. 10 is a diagram showing a slotted reaction plate for the linear machines of FIG. 9a and FIG. 9b.

A very simple electrical configuration, for example, one based on the type of windings shown in FIG. 2, can be obtained by slotting a solid conducting sheet. In FIG. 10, a plate 45 is slotted at 46, 46', 46" and so forth, so that the induced currents are constrained to flow in the desired concentric paths. Such a reaction plate is very simple to construct.

The linear machine of the present invention can be operated synchronously in the same way as the cylindrical two-element machine, without any connections to the secondary member. There is then a prospect of a much improved power-factor. As is well known, the conventional linear induction motor operates at a very low power-factor, due to its large air-gap. It is possible, therefore, that synchronous operation of a linear machine according to the invention would remove, or at least alleviate, one of the major problems associated with conventional linear machines.

I claim:

1. An alternating-current, burshless, stator-controlled electric motor, for asynchronous operation, comprising first and second machine elements, the first machine element comprising a first wound stator and a first rotor, said second machine element comprising a second wound stator and a second rotor, both said first and second rotors having rotor asymmetry in two axes electrically at right-angles, said first and second wound stators being connected together electrically in parallel and coupled together mechanically with an electrical displacement therebetween defining a first electrical displacement, said first and second rotors being coupled together mechanically with an electrical displacement therebetween defining a second electrical displacement, the sum of said first and said second electrical displacements being substantially $\pi/2$ radians so that currents corresponding to backward field components are in antiphase in said first and said second wound stators.

2. An electric motor as claimed in claim 1, in which rotor asymmetry is provided by the same electromagnetic construction of both said rotors.

3. An electric motor as claimed in claim 2, in which both said rotors are wound to provide different direct-axis impedance and quadrature-axis impedance.

4. An electric motor as claimed in claim 3, in which both said rotors are salient pole rotors with short-circuited windings in the quadrature-axis.

5. An electric motor as claimed in claim 3, in which both said rotors are wound with concentric coil groups providing short-circuited windings in the quadrature axis.

6. An electric motor as claimed in claim 3, in which both said rotors are arranged with short-circuited conductor loops providing short-circuit in the quadrature axis.

7. An electric motor as claimed in claim 2, in which both said rotors are of flux-barrier construction.

8. An electric motor as claimed in claim 2, in which both said rotors are of segmental construction.

9. An electric motor as claimed in claim 1 in which each said stator is wound with a polyphase winding.

10. An electric motor as claimed in claim 9, adapted for asynchronous running, having 3-phase supply connections to 3-phase windings of said stators in parallel.

11. An electric motor as claimed in claim 9, adapted for synchronous running, having 3-phase alternating current supply connections to 3-phase winding of said stators in parallel-star, together with direct current supply from the outer ends to the star points of the three phase-windings of the two said stators.

12. An electric motor as claimed in any one of claim 1, having the two said stators in a single frame and the two rotors mounted on a common shaft therein.

13. An electric motor as claimed in claim 1, alternatively for asynchronous and synchronous operation, in which the first and second stators are both polyphase wound and are arranged with the two sets of phase-windings parallel-star connected together between alternating current supply terminals and with corresponding phase-windings serially connected together between direct current supply terminals.

14. An electric motor as claimed in claim 13, in which said first and second stators are both 3-phase wound and are arranged with the two sets of three phase-windings parallel-star connected together between first and second star-points, one phase-winding of the second wound stator being connected to said first star-point and the corresponding phase-winding of said first wound stator being connected to said second star-point and a pair of direct current supply terminals being connected to said first and second star-points, respectively.

* * * * *